US 6,746,657 B2

(12) United States Patent
Castaldi

(10) Patent No.: US 6,746,657 B2
(45) Date of Patent: Jun. 8, 2004

(54) METHOD FOR REDUCED METHANATION

(75) Inventor: Marco J. Castaldi, Bridgeport, CT (US)

(73) Assignee: Precision Combustion, Inc., North Haven, CT (US)

( * ) Notice: Subject to any disclaimer, the term of this patent is extended or adjusted under 35 U.S.C. 154(b) by 0 days.

(21) Appl. No.: 10/095,884

(22) Filed: Mar. 12, 2002

(65) Prior Publication Data

US 2003/0175198 A1 Sep. 18, 2003

(51) Int. Cl.$^7$ .............................. C01B 3/16; C01B 31/20
(52) U.S. Cl. .................... 423/437.2; 423/246; 423/247; 423/655; 423/656
(58) Field of Search ........................... 423/437.2, 655, 423/656, 246, 247

(56) References Cited

U.S. PATENT DOCUMENTS

| | | | | |
|---|---|---|---|---|
| 5,518,705 A | * | 5/1996 | Buswell et al. .......... 423/437.2 |
| 6,361,896 B1 | * | 3/2002 | Eberle et al. ............ 423/437.2 |
| 6,475,454 B1 | * | 11/2002 | Cole et al. ............... 423/437.2 |
| 6,482,378 B1 | * | 11/2002 | Nojima et al. ........... 423/437.2 |
| 6,488,838 B1 | * | 12/2002 | Tonkovich et al. ...... 423/437.2 |
| 6,495,113 B2 | * | 12/2002 | Aoyama ................... 423/437.2 |
| 6,528,032 B1 | | 3/2003 | Nojima et al. |
| 6,531,106 B1 | * | 3/2003 | Nojima et al. ........... 423/437.2 |
| 6,540,975 B2 | * | 4/2003 | Tonkovich et al. ......... 423/656 |
| 6,548,034 B2 | * | 4/2003 | Takamura et al. ....... 423/437.2 |
| 6,555,088 B1 | * | 4/2003 | Baumann et al. ........ 423/437.2 |
| 6,616,909 B1 | * | 9/2003 | Tonkovich et al. .......... 423/655 |

* cited by examiner

Primary Examiner—Wayne A. Langel
(74) Attorney, Agent, or Firm—McCormick, Paulding & Huber LLP

(57) ABSTRACT

The invention disclosed is a method for the reduction of carbon monoxide to carbon dioxide in a gas stream comprising carbon monoxide, hydrogen and water vapor, wherein the carbon monoxide and hydrogen have a mole ratio greater than 5:1, with substantially reduced methanation. The invention utilizes a reactor having at least one channel having a catalyst positioned thereon and a flow rate of the gas stream over the catalyst such that a boundary layer having a thickness less than a maximum thickness boundary is created.

14 Claims, 1 Drawing Sheet

METHOD FOR REDUCED METHANATION

CROSS-REFERENCE

This invention was made with government support under NSF Grant No. 0060771. The U.S. government has certain rights in this invention.

FIELD OF THE INVENTION

The present invention is generally directed to a chemical reaction supported by a catalyst, and more specifically relates to a method of converting carbon monoxide to carbon dioxide in the presence of hydrogen with reduced methanation.

BACKGROUND OF THE INVENTION

The elimination of, or reduction in, carbon monoxide from a gas stream containing carbon monoxide, hydrogen and water vapor without significant consumption of hydrogen can be of value in numerous situations where the hydrogen will subsequently be used. One such example is in a fuel cell where hydrogen provides the fuel but carbon monoxide is a poison.

There are multiple fuel cell designs of which one is a Proton Exchange Membrane fuel cell (PEMFC). While the present invention finds utility with respect to PEMFC's, and such use is described herein, the present invention should not be considered to be limited in such regard. The present invention also finds utility in other applications where reduced methanation is desirable.

A PEMFC includes an anode side and a cathode side separated by an electrolyte that acts as a membrane. On the anode side, hydrogen is introduced and each hydrogen molecule is split into two positively charged hydrogen ions. Simultaneously on the cathode side, oxygen molecules are introduced and each oxygen molecule is split into two negatively charged oxygen ions. The electrolyte is treated to conduct only positively charged ions, thus the negatively charged oxygen ions attract the positively charged hydrogen ions pulling them through the electrolyte. The electrons released in the splitting of the hydrogen molecule are conducted through an anode on the anode side to an external circuit to a cathode on the cathode side where the hydrogen ions and oxygen ions combine to form water.

Hydrogen is the fuel used to operate a fuel cell and must be generated, e.g. concentrated or released from a molecule containing hydrogen, as hydrogen is not available in a natural form suitable for use as a fuel. One source of hydrogen is fossil fuel, such as gasoline, that is reformed to release the hydrogen contained therein. Gasoline is particularly desirable as a hydrogen source when the fuel cell is to be used as a power plant in a non-stationary item such as an automobile. A problem with obtaining hydrogen from gasoline, however, is that in the reformation process hydrogen is generated in combination with other gases such as carbon monoxide.

Carbon monoxide contaminates the membrane within a PEMFC potentially rendering the fuel cell less efficient or inoperative. Therefore, carbon monoxide must be removed from, or substantially reduced in, the gas stream containing the hydrogen prior to the gas stream being introduced into the PEMFC.

One method of reducing the carbon monoxide in a gas stream containing carbon monoxide (CO), hydrogen ($H_2$) and water vapor ($H_2O$) is to convert it to carbon dioxide ($CO_2$) and hydrogen using a catalyst (employing the water gas shift reaction $CO+H_2O=CO_2+H_2$). To accomplish this, low operational catalyst temperatures are preferred, since at high temperatures additional carbon dioxide can result in the production of carbon monoxide. High operational catalyst temperatures, on the other hand, are problematic in that the hydrogen tends to combine with either the carbon monoxide, or carbon dioxide, if present, to form methane ($CH_4$) and water in a process referred to as methanation ($CO+3H_2=CH_4+H_2O$, or $CO_2+4H_2=CH_4+2H_2O$). For each molecule of methane formed by methanation, the available hydrogen for the fuel cell is reduced. It is, therefore, desirable to employ a method that reduces the concentration of carbon monoxide without simultaneously reducing the hydrogen present, or at least minimizing the consumption of hydrogen by the methanation process.

Based on the foregoing, it is an objective of the present invention to develop a method for the removal of carbon monoxide from a gas stream comprising carbon monoxide, hydrogen and water vapor wherein the consumption of hydrogen therein is minimized thereby resulting in a gas stream having a higher concentration of hydrogen than would otherwise be obtained.

SUMMARY OF THE INVENTION

The present invention in one aspect is a method for the conversion of carbon monoxide to carbon dioxide in the presence of hydrogen with reduced methanation using a catalytic reactor having at least one channel defined at least in part by a catalytic surface. The catalytic surface is suitable for supporting a water gas shift reaction. At least a portion of the gas stream, which comprises carbon monoxide, hydrogen and water vapor, wherein the hydrogen is greater than or equal to five (5) times the carbon monoxide in terms of percent mole concentration, is then passed through the at least one channel at a flow rate such that a boundary layer formed over the catalytic surface has a thickness less than that of a fully developed boundary layer.

The gas stream can have other constituents, such as oxygen and carbon dioxide. However if oxygen is present, it should be minimized as it will combine with the hydrogen to form water. The consumption of hydrogen by oxygen to form water is equally undesired as is the consumption of hydrogen by carbon to form methane, where it is desired that the output gas stream contain as much hydrogen as possible. The molar ratio of oxygen should be less than 5:1 to that of carbon monoxide to minimize hydrogen consumption.

If carbon dioxide is present in the entering gas stream, the surface temperature of the catalytic surface should be maintained below about 450 degrees C. If the surface temperature exceeds about 450 degrees C., the carbon dioxide will combine with the hydrogen to form methane. Preferably, the concentration of carbon dioxide should not exceed a maximum amount, e.g. 25% at about 450 degrees C., which includes carbon dioxide created from the carbon monoxide.

The molar ratio of carbon monoxide to water within the gas stream is based on reaction stoichiometry. If it is the intent to convert all the carbon monoxide (CO) to hydrogen ($H_2$), there needs to be at least an equimolar concentration of water to carbon monoxide. Therefore, it is preferred that the water to carbon monoxide ratio be greater than 1.0.

The invention relies on a controlling the thickness of the boundary layer within the fluid in the channel in the area of the catalyst such that the thickness of the boundary layer is less than the thickness of a fully-developed boundary layer. More specifically, a boundary layer is a region within a fluid flowing near a surface where the velocity of the fluid is less than the main bulk flow velocity. A boundary layer results from the viscous effects of the surface of the channel. These viscous effects are reduced the further the fluid is away from the surface, thus there is a velocity gradient within the fluid.

In a smooth channel of infinite length, the boundary layer begins at the entrance to the channel and increases to a fully-developed boundary layer at some penetration distance from the entrance. The penetration distance required to achieve a fully developed boundary layer is dependent upon the entering velocity and viscosity of the fluid. All boundary layers have a thickness, with the maximum thickness occurring when the boundary layer is fully-developed.

The thickness of the boundary layer can be maintained below the maximum thickness by assuring that the length of the channel is shorter than the penetration distance required to achieve a fully developed boundary layer. Alternatively, the thickness of the boundary layer can also be maintained below the maximum thickness in a channel having a length greater than the penetration distance by the use of flow disruption devices such as trip strips.

Based on flat plate geometry the velocity profile can be calculated using the equation:

$$V_x = U_\infty erf\left(\frac{1}{2}z\sqrt{\frac{U_\infty}{xv}}\right)$$

where:
$V_x$=the velocity in the channel in the x-direction
$U_\infty$=the free stream velocity
z=distance from the surface (perpendicular)
x=the penetration into the channel
v=viscosity As gases tend to have generally equal viscosity's, a fully developed boundary layer has a maximum thickness of about 0.03 inches for a given bulk velocity, temperature, pressure and viscosity. As those skilled in fluid mechanics will appreciate, as the viscosity of the fluid increases the maximum thickness for a fully developed boundary layer decreases.

The catalyst comprises at least one platinum group metal, which is defined as a group of transition metals that includes osmium, rhodium, iridium, palladium, and platinum, or gold. The invention should not be considered limited to the elemental forms of the platinum group metals, and gold as other forms such as molecules containing the platinum group metal could be used, such as oxides. The catalyst may be mixed with, or supported on, other substances such as alumina in any phase, or silica. The catalyst may also be stabilized, such as by the use of lanthanum.

DETAILED DESCRIPTION OF THE INVENTION

Figure 1:
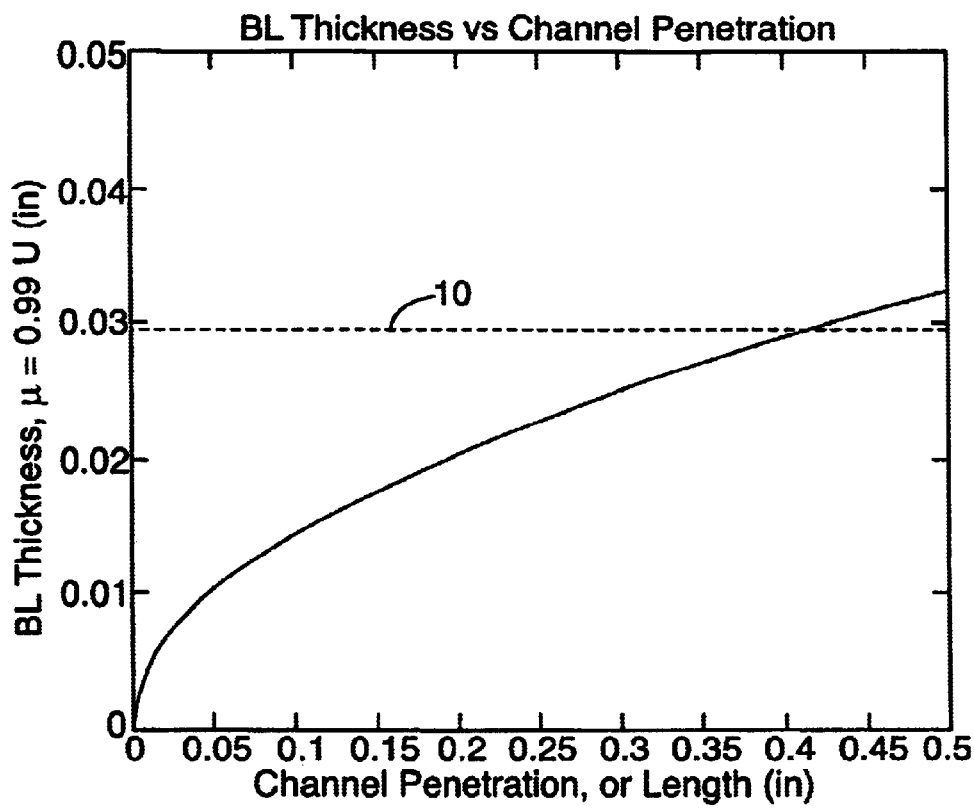
FIG. 1 is a plot of Channel Penetration v. Boundary Layer Thickness.

As generally shown in FIG. 1, a fluid flowing over a surface creates a boundary layer having a momentum thickness, i.e. BL Thickness. As the channel penetration distance increases, the thickness of the boundary layer tends to increase to an asymptotic point 10 that is the maximum thickness of the boundary layer. In the case of the present invention wherein a gas is used and of which this graph is representative, the asymptotic point occurs at a boundary layer thickness of about 0.03 inches that corresponds to a channel penetration of about 0.45 inches. A gas flowing in a channel having a channel length shorter than 0.45 inches, or a channel having a length longer than 0.45 inches incorporating properly positioned flow disruption features, will therefore never develop a boundary layer having the maximum thickness. On the other hand, fluids flowing in channels having channel lengths longer than 0.45 inches without appropriately positioned flow disruption features will develop a boundary layer having the maximum thickness.

Figure 2:
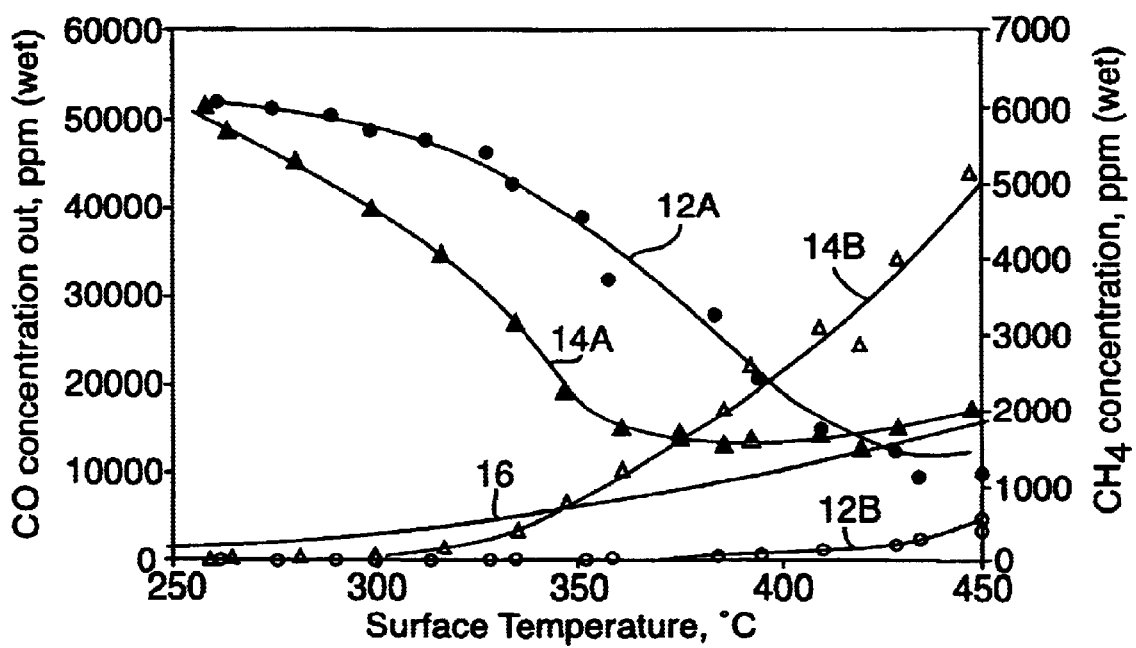
FIG. 2 is a plot of Surface Temperature versus CO Concentration and $CH_4$ Concentration out for two similar reactors one operating in accordance with the present invention and one operating outside of the method of the present invention.

FIG. 2 shows the results of an experiment comparing two similar reactors operating at similar conditions but having different channel lengths. More specifically, one catalytic reactor utilizes a plurality of stacked short-channel substrates, i.e. channel length of each substrate being based on whether the fluid flow therethrough would develop a boundary layer having a thickness less than the maximum thickness, referred to as a short-channel reactor, and the other utilizes a long channel substrate, i.e. channels have a length greater than or equal to that required to allow for development by the fluid flowing therethrough of a boundary layer having the maximum thickness, more commonly referred to as a monolith.

The experiment was designed to compare the same size reactor using the same total flow rate with the same inlet species compositions and the same temperature scan range and rate. Each reactor utilized substrates having 400 cells per inch. The length of the channels of the short-channel substrates of the short-channel reactor was 0.008 inches and of the monolith was 0.5 inches. The short-channel substrate was made of metal, i.e. HAYNES 230, and the monolith was ceramic. There were 50 stacked short-channel substrates in the short-channel reactor and one monolith in the monolith reactor. The short-channel substrates were stacked front to back into a bed with channels of the adjacent substrates being non-aligned.

The catalyst formulation and amount within each reactor was controlled so that each reactor would have equivalent specific surface area and dispersion. The monolith was made from a one-half inch deep, 400-cells per inch ceramic monolith cut into an approximately $15/16^{th}$ inch diameter cylinder. After weighing, the monolith was immersed in a gamma alumina washcoat slurry and removed, with excess washcoat was removed using compressed air. The monolith was then placed in a muffle furnace, preheated to 500 degrees C., for one hour, and then taken out and cooled in air. The monolith was weighed again and the loading of washcoat determined based on the increased weight. The monolith was then immersed in a 0.20 molal lanthanum nitrate solution, with the excess solution removed using compressed air. The monolith was then calcined in an oven preheated at 900 degrees C. for five hours. The loading of the lanthanum, as lanthanum oxide, was calculated. The alumina loading was 0.6245 grams and the loading of lanthanum was 0.1244 grams. The monolith was then dipped into a five percent tetraamine platinum nitrate solution and calcined in a preheated oven at 500 degree C. for 21 hours. This step was repeated until the loading of platinum on the monolith was 0.1967 grams. This process resulted in a monolith having a total stabilized alumina slipcoat loading of 0.7489 grams and platinum loading of 0.1967 grams.

The short-channel substrates were prepared as follows. An expanded metal strip having 400 cells per inch was oxidized at 1100 degrees C. for one hour. The strip was then coated with gamma alumina washcoat by immersion to yield a 20 mg/in² weight gain of alumina. The strip was then calcined in a preheated muffle furnace at 500 degrees C. for one hour. The strip was then coated with a 0.21 molal lanthanum nitrate solution to yield a 3.65 mg/in² loading of lanthanum. The strip was then calcined in a preheated muffle furnace at 900 degrees C. for five hours. Platinum, from a five percent tetraamine platinum hitrate solution, was then applied to the strip. The strip was then calcined in a preheated oven at 500 degrees C. for one hour. The platinum application procedure produced a strip with a 5.4 mg/in² loading of platinum. A reactor having 50 strips was constructed. The resulting reactor contained a total stabilized aluminum slip coat loading of 0.8162 grams, and a platinum loading of 0.1864 grams.

The gas stream entering the reactor comprised carbon monoxide, hydrogen and water vapor. More specifically, the gas stream had the following mole ratios: $H_2$-27.4%; $CO_2$-9.6%; CO-5.7%; and $H_2O$ 32.8%. The balance of the gas stream was $N_2$ and inevitable impurities. The Equilibrium CO Concentration, shown in FIG. 2, was calculated via Stanjan calculation, which is a minimization of the Gibbs free energy between reactants and products.

The gas stream was preheated so that the reaction occurring when the gas stream contacted the catalyst would produce a range of surface temperatures from about 250 degrees C. to 450 degrees C. The flow rate was set and each reactor sized to give a space velocity, i.e. the volumetric flow rate divided by the volume, of 110,000 $hr^{-1}$. During testing, all influential conditions were held constant as well as temperature scan and gas sample rates. The above manufacturing procedure and the testing conditions resulted in side by side tests that were comparable as to the results obtained.

In FIG. 2 the performance of the short-channel reactor is generally depicted by the line 12 where line 12A shows the carbon monoxide (CO) concentration out and line 12B shows the methane ($CH_4$) concentration out. The performance of the monolith reactor is similarly depicted by the line 14 which also has 14A and 14B parts consistent with the 12A and 12B parts.

As can readily be observed, the lines 12A and 14A begin to diverge at about a surface temperature of 300 degrees C. As should readily be appreciated, the divergence results from the fact that the hydrogen within the gas stream passing through the short-channel reactor is not being combined with the carbon within the carbon monoxide, or carbon dioxide to form methane. Thus, the gas stream out of the short-channel reactor is relatively richer in hydrogen than the gas stream out of the monolith reactor.

The thickness of the boundary layer can be adjusted to alter the selectivity to hydrogen. Calculations indicate that a thickness no greater than 0.01 inches, 33% of the maximum thickness (0.01/0.03), will result in a 1,000 ppm methane concentration, while a thickness no greater than $9\times10^{-7}$ inches, 0.003% of the maximum thickness, will result in a methane concentration of 1 ppm. The experiment above used a thickness no greater than 0.005 inches, or 17% of the maximum thickness, giving a 400 ppm methane result.

The real comparison, however, is at a surface temperature of about 400 degrees C. where both reactors achieve equilibrium carbon monoxide conversion (denoted by line 16), but the short-channel reactor is consuming approximately $\frac{1}{20}^{th}$ the amount of hydrogen. As those skilled in the art of reactor design will appreciate, there is a tradeoff between surface temperature and space velocity such that a reduction in space velocity will cause an increase in surface temperature. Therefore, the term "about" as used with an identified surface temperature is meant to recognize this known tradeoff.

In a subsequent experiment, it was determined that for a short-channel reactor, the amount of methanation could be halved by doubling the space velocity without effecting the temperature at which CO equilibrium is achieved.

While the present invention has been described in considerable detail with reference to certain preferred versions thereof, other versions are possible. Therefore, the spirit and scope of the invention should not be limited to the description of the preferred versions contained herein.

What is claimed is:

1. A method for the conversion of carbon monoxide to carbon dioxide in the presence of hydrogen with reduced methanation comprising the steps of:

providing a catalytic reactor having at least one channel defined at least in part by a catalytic surface suitable for supporting a water gas shift reaction; and presenting a gas stream at a known flow rate and inlet temperature to said at least one channel so that a boundary layer formed thereby relative to said catalytic surface defines a thickness that is less than the thickness of a fully-developed boundary layer over said catalytic surface, the hydrogen mole concentration being greater than or equal to five (5) times the carbon monoxide mole concentration; and generating a reaction such that oxidation of said gas stream occurs preferentially converting said CO to $CO_2$.

2. The method of claim 1 including the additional step of adjusting the flow rate to produce a thickness less than 0.03 inches.

3. The method of claim 2 including the additional step of adjusting the flow rate to produce a thickness of about 0.008 inches.

4. The method of claim 1 wherein said catalytic surface comprises platinum.

5. The method of claim 4 wherein the catalytic surface includes a washcoat.

6. The method of claim 5 wherein said washcoat comprises alumina.

7. The method of claim 6 wherein said catalytic surface is stabilized with a stabilizer.

8. The method of claim 7 wherein said stabilizer includes lanthanum.

9. The method of claim 1 wherein said catalytic reactor is comprised of a plurality of said channels wherein at least one of said channels is defined by substrate and another of said channels is defined by another substrate.

10. The method of claim 1 wherein said gas stream comprises carbon dioxide.

11. The method of claim 1 including the further step of adjusting the mole ratio of said carbon monoxide to said carbon dioxide to a ratio greater than 1.0.

12. The method of claim 1 further including the step of adjusting the flow rate and the inlet temperature to produce a temperature on said catalytic surface less than 450 degrees C.

13. The method of claim 1 wherein said at least one channel has a length less than 0.45 inches.

14. The method of claim 1 further including the step of adjusting said flow rate and said inlet temperature to produce a temperature on the catalytic surface greater than about 300 degrees C.

* * * * *